Nov. 26, 1957   F. W. MÜLLER   2,814,232
PICTURE PROJECTION WINDOW FOR USE IN A PROJECTION CABIN
Filed June 11, 1954
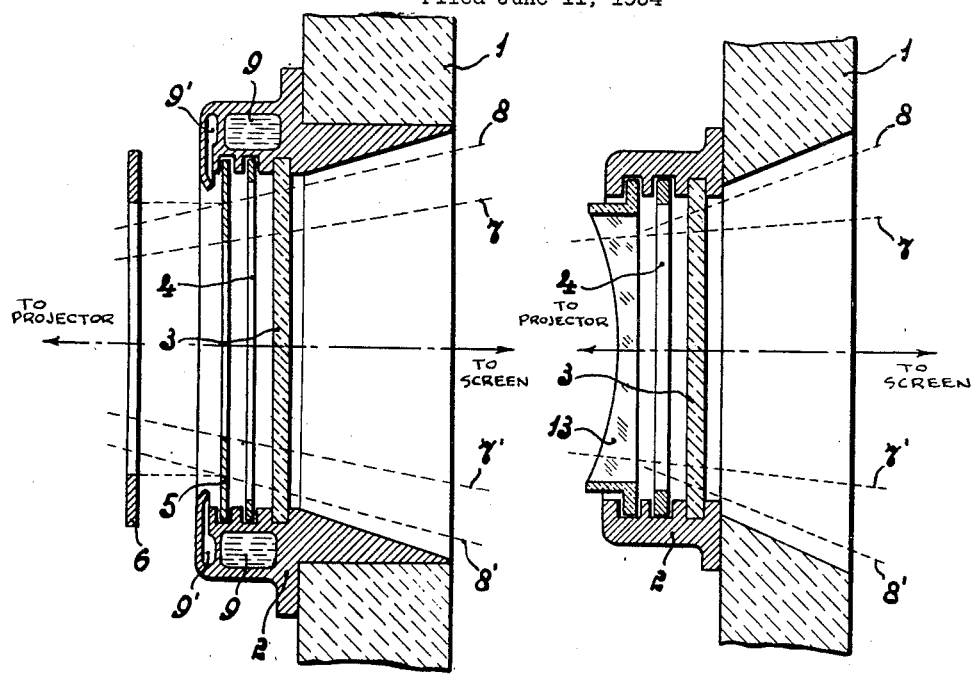
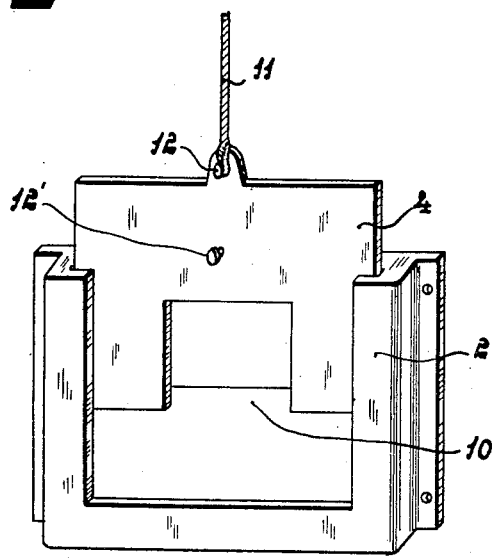
INVENTOR
FRIEDRICH WILHELM MÜLLER
BY
AGENT

2,814,232
PICTURE PROJECTION WINDOW FOR USE IN A PROJECTION CABIN

Friedrich Wilhelm Müller, Hamburg-Blankenese, Germany, assignor, by mesne assignments, to North American Philips Company, Inc., New York, N. Y., a corporation of Delaware Application June 11, 1954, Serial No. 436,216

Claims priority, application Germany August 17, 1953

4 Claims. (Cl. 88—24)

The present invention relates to projection windows for use in a projection cabin. More particularly, the invention relates to a projection window which can be adapted to the reproduction of different kinds of films, more particularly panorama films or stereoscopic films. In general, use has hitherto been made for this purpose of an opening of about 50 by 50 centimeters in the wall of the cabin said opening being closed for safety by a safety window and being provided with a fire screen which is automatically slipped over the safety window in the case of fire in order to reinforce the screening between the cabin and the screen room and to ensure an optical closure to prevent panic. With the introduction of the new panorama films and stereoscopic films it has been found that the projection window hitherto used no longer satisfies the requirements. More particularly, with the reproduction of panorama films it is necessary to widen the projection window sufficiently, since the width of the light beam emanating from the objective of the projector is increased accordingly. A suitable widening of the projection window in the conventional construction has, however, the disadvantage that unwanted light penetrates from the cabin into the screen room, if a normal film is to be reproduced with such a widened projection window. Furthermore, in many cases it is not desirable to readjust the projector itself to the reproduction of panorama films, and the cabin may require structural changes.

According to the invention, these disadvantages are obviated, since the auxiliary optical means for the reproduction of the film can be slipped into a frame surrounding the projection window, the fire screen and the safety window. By such optical auxiliary means it is possible to sufficiently prevent the penetration of unwanted light into the screen room. If desired, such optical expedients may be used to prevent appreciable structural changes of the opening in the wall for the projection window. The possibility of providing such optical expedients on the projection window provides at the same time the possibility of carrying out the reproduction of stereoscopic films with polarized light in a simple manner.

In one embodiment of the invention the cross-sectional area of the window is made wide enough for the reproduction of panorama films and when normal films are to be reproduced the screen room is screened from unwanted light emanating from the cabin by a slidable mask. In this case, the screening mask does not require a special guide at the frame of the projection window. The mask may be constituted by the lower part of the adequately prolonged safety screen, which has a corresponding recess. In this case, the fire screen may be suspended at a variable height, and in its uplifted position may leave either the mask or the complete window section free. It is irrelevent whether the fire screen is lowered electrically or mechanically.

With stereoscopic films the device may be modified, in a preferred embodiment of the invention, in a manner such that polarization filters, if necessary in conjunction with deflection means, may be slipped into the frame. If the mask is used for protection from unwanted light, these filters may have the form of sheets filling out the recess of the mask. With the stereoscopic film projection operating with two projectors which project the partial images with polarization directions at right angles to one another onto the screen, the two projection windows should be provided with polarization filters having polarization directions at right angles to one another. If the lower part of the fire screen is used as a mask, the polarization filter may be secured in the recess of the fire screen. The arrangement is preferably such that the filter may be inserted into the screen, so that the same screen may be used for the projection of normal films.

It is known that the material used hitherto for polarizing means is dependent upon temperature. Thus, in view of the heat occurring in the projector beam, it is desirable to provide the frame with a cooling means. The hollow frame may be cooled, for example, by means of a cooling liquid. Furthermore, the means, such as polarization filters, which are slipped into the frame, may be cooled by a flow of cold air.

However, if the recess of the window in the cabin must remain substantially unchanged, the arrangement in another preferred embodiment of the invention may be such that the sectional area of the window is adapted to the reproduction of normal films, and when panorama films are to be reproduced, an optical system diverging the emanating light beams, or the optical system required for developing the panorama image, can be slipped into the frame. The optical system may be slipped into the frame directly, if necessary. The optical projection system has a size such that the emanating light beam is not wider than that present with the projection of normal films. The widening of the light cone required for the panorama image is obtained in this case only in the optical system in the frame of the projection window. It is then possible to provide a projector comprising particular optical means for the development of a separate panorama image. However, use may be made of a normal image projector, the image being developed in the optical system on the projection window.

Since in most cases the optical axis of the projector must be slightly pivotable in a vertical plane relative to the image adaptation, it is useful to employ a lens system of the concave cylinder lens type permitting the vertical sweep of the projector beam for adjustment in front of the optical system which may be slipped into the window frame the properties of the lens systems may, if necessary, be taken into account with the design of the development optical system to be provided in the projector.

In order that the invention may be readily carried into effect it will not be described with reference to the accompanying drawing, wherein:

Fig. 1 is a schematic diagram, in sectional view, of an embodiment of a cooled projection window according to the invention, Fig. 2 is a schematic diagram, in perspective, of an embodiment of a window frame, in accordance with the invention, comprising a fire screen formed in the shape of a mask; and Fig. 3 is a schematic diagram, in sectional view, of an embodiment of a projection window, in accordance with the invention, having a slidable optical system for panorama projection.

Referring to Fig. 1, the wall 1 of the cabin has a frame 2, comprising in known manner a safety window 3 and a fire screen 4. The safety window 3 is stationary, the fire screen 4 slides in grooves of the frame 2. Another groove is provided in the frame 2, into which masks 5 or 6 may be slipped. The mask 5 is intended for use with the projection of normal films; to this end it has a suitable relatively small recess. The light source indicated by the broken line 7, 7' for the projection of normal films approximately fills the recess of the mask 5, so that said mask prevents unwanted light from penetrating into the screen room. This unwanted light is always due to the required general illumination of the cabin. If a panorama film is to be reproduced, instead of a normal film, the mask 5 is replaced by the mask 6 which has an adequately relatively larger recess. The mask 6 is adapted to the width of the light source indicated by the broken line 8, 8' for the panorama film. Instead of using the masks 5 or 6, other optical means may be provided in the frame 2, such as for example, polarization filters. If necessary, deflection means used for accurate relative overlapping of the two stereoscopic images each polarized in a different manner, may be utilized. In order to protect these filters from harmful heat, the frame 2 is provided with cavities 9 and cooled by water, or a suitable cooling fluid, in the manner shown. Moreover provision is made of an additional, independent cavity 9' to which compressed air is supplied and which is provided with distributing funnels leading the flow of air to the inserted optical means and cooling it.

In Fig. 2, in the frame 2 the fire screen 4 is slidable; for the sake of simplicity the safety window 3 is not shown, in its lower part the fire screen has a suitable recess 10 used for the mask, its sides screening off the unwanted light from the cabin with the projection of normal films. The fire screen 4 is held by suitable means such as a string 11, which may be connected to the projector, in a manner known and not further described, so that said fire screen is released in case of fire and slides down in the guides until it strikes a transverse rib at the bottom of the frame. The upper part of the fire screen 4 covers the projection window in the required manner. The string 11 engages suitable connecting means on the fire screen 4, such as a bolt 12, and the arrangement is such that then the proper sectional area required for the projection of normal films is just left free for the light cone. If a panorama film is to be reproduced, the string 11 is taken off the bolt 12 and secured to other suitable connecting means on the fire screen 4, such as a second bolt 12'. Since the length of the string 11 does not change, when said string is connected to the bolt 12' the fire screen 4 is raised relatively to its position when said string is connected to the bolt 12. Thus, the fire screen 4 uncovers the complete proper opening for the projection of panorama films when the string 11 is connected to the bolt 12'.

The embodiment of Fig. 3, for a projection window according to the invention corresponds primarily to that of Fig. 1, but it is relatively narrower, so that its utilization does not necessitate a modification of the recess in the wall 1 of the cabin. The frame 2 is shown in a simple form, which is not cooled; it may of course be provided with cooling means. The frame 2 comprises an optical system 13, which corresponds primarily to a concave cylinder lens for the reproduction of a panorama film. The luminous cone indicated by the broken lines 7, 7' is changed into a cone indicated by the broken lines 8, 8' when normal film is projected; this means that the divergence of the light beam becomes materially greater behind the optical system 13. The size of the cylinder lens 13 is such that the image width required for the panorama image is obtained. The optical system of the projector may comprise an image developing device, which, however, must not vary materially the angular aperture of the emanating luminous cone. However, as an alternative, the optical system 13 may be used not only for the required divergence of the luminous beam but also for the development of the film image. The optical system 13 is, moreover, such that a sweep of the optical axis of the projector in a vertical plane through the required small angles can be carried out without deformation of the image.

While the invention has been described by means of specific examples and in specific embodiments, I do not wish to be limited thereto, for obvious modifications will occur to those skilled in the art without departing from the spirit and scope of the invention.

What is claimed is:

1. A frame assembly for adjusting the size and quality of images optically projected from a projector in a projection cabin onto a screen, said projection cabin having an opening in a wall thereof and said projector emitting a beam of light axially aligned with the opening in the wall of the cabin for transmitting the beam of light to the screen, comprising a frame mounted in said opening and having an aperture therein co-axial with the opening in said cabin wall, said frame having a plurality of guide slots therein for receiving a plurality of optical attachments, said attachments including means for adjusting the opening in said cabin to the desired dimension of said beam of light whereby screen images of various size and quality may be conveniently obtained.

2. A frame assembly as claimed in claim 1 in which at least one of said attachments is a fire screen extendable in one position for completely intercepting said beam of light, said fire screen having a recessed portion thereon corresponding to a desired size of said beam of light and alignable therewith in another position thereof.

3. A frame assembly as claimed in claim 1 in which at least one of said attachments includes a divergent lens system for magnifying the beam of light emanating from the cabin.

4. A frame assembly as claimed in claim 1 in which said frame has a channel between said guide slots for circulating liquid coolant therethrough and a conduit formed on a rim of said frame adjacent to projector for circulating gaseous coolant on the surface of an attachment in the guide slot adjacent said conduit.

References Cited in the file of this patent

UNITED STATES PATENTS

| | | |
|---|---|---|
| 1,646,855 | Riccio | Oct. 25, 1927 |
| 1,650,479 | Woodland | Nov. 22, 1927 |
| 1,818,355 | Readeker | Aug. 11, 1931 |
| 1,948,972 | Newman | Feb. 27, 1934 |
| 1,985,629 | Crabtree | Dec. 25, 1934 |
| 2,001,683 | Jackman | May 14, 1935 |
| 2,089,703 | May | Aug. 10, 1937 |
| 2,120,596 | Avery | June 14, 1938 |
| 2,309,879 | Willis | Feb. 2, 1943 |
| 2,493,612 | Blanchet | Jan. 3, 1950 |